United States Patent [19]

Levine et al.

[11] Patent Number: 5,356,715
[45] Date of Patent: Oct. 18, 1994

[54] VIBRATION DAMPING RESINS AND VIBRATION DAMPING COMPOSITES

[75] Inventors: Harold H. Levine, Encinitas, Calif.;
J. Brandon Simons, Crystal Lake, Ill.;
Randall J. Meyer, Woodstock, Ill.;
Christine M. Zack, Crystal Lake, Ill.;
Steven J. Ney, Woodstock, Ill.

[73] Assignee: Morton International, Inc., Chicago, Ill.

[21] Appl. No.: 923,089

[22] Filed: Jul. 31, 1992

[51] Int. Cl.$^5$ .................... B32B 15/08; C08F 20/00
[52] U.S. Cl. .................... 428/416; 428/458; 428/480; 428/913; 525/438; 525/408
[58] Field of Search ............. 428/458, 414, 416, 913, 428/480; 525/438, 408

[56] References Cited

U.S. PATENT DOCUMENTS

| | | | |
|---|---|---|---|
| 4,584,353 | 4/1986 | Kobayshi et al. | 525/438 |
| 4,859,523 | 8/1989 | Endoh et al. | 428/215 |
| 4,883,717 | 11/1989 | Kitamura et al. | 428/458 |
| 4,942,219 | 7/1990 | Yatsuka et al. | 528/272 |
| 5,030,488 | 7/1991 | Sobolev | 428/35.9 |

*Primary Examiner*—P. C. Sluby
*Attorney, Agent, or Firm*—Wayne E. Nacker; Gerald K. White

[57] ABSTRACT

Viscoelastic resins useful for forming vibration damping composites, i.e., metal layers adhered by the resins, contain only the elements hydrogen, oxygen and carbon and provide vibration damping over a wide temperature range. The resins are generally linear, high molecular weight polymers having blocks of epoxy and either polyester or polyether.

8 Claims, No Drawings

VIBRATION DAMPING RESINS AND VIBRATION DAMPING COMPOSITES

The present invention is directed to vibration damping resins and composites formed therefrom. More particularly, the invention is directed to vibration damping resins formed from components having only the elements hydrogen, oxygen and carbon.

BACKGROUND OF THE INVENTION

Vibration damping resins displaying viscoelastic behavior for use in forming metal laminates are known. For example, U.S. Pat. No. 4,859,523, the teachings of which are incorporated herein by reference, describes polyurethanes useful for forming metal-resin-metal composites. The viscoelastic resin layer, that adheres two metal layers, damps vibration by converting external vibrational energy to heat energy. Vibration damping is useful in reduction of noise and prevention of metal fatigue. Vibration-damped metal has a wide variety of applications where vibrational noise is of concern, particularly in the automotive industry. The use of vibration damping composites is known for oil pans, engine covers, rocker panels, air filters covers, and other automotive parts.

A great deal is expected of a resin whose intended use is to damp vibration, particularly when it is desirable to damp vibration over a wide temperature range. In a typical process for forming a vibration-damping composite, the resin can be applied to a metallic substrate by various techniques, typically by coil-line technology.

In forming a component part, the laminate is shaped by deep drawing and/or stamping. If the formed part is an automotive part, it will be part of the automobile and exposed to about 400° F. for about 45–60 minutes to bake the paint coating on the car. In use, it is desirable for the composite to damp vibration over a wide operating temperature range (this range may vary widely, depending upon the use environment of the component).

It can be appreciated that a viscoelastic resin must have chemical and physical stability over a wide temperature range. It must also be able to both adhere the layers of metal together and effectively damp vibration over a wide temperature range. Throughout the entire processing temperature range of the laminate-forming process, component-forming process, and baking process, the resin must not ooze from between the metal layers. The resin should provide sufficient peel strength upon formation of the composite so as to survive passage through the coil coating/laminating process or any other conditions selected to form the composite. To withstand the drawing and/or stamping steps which occurs during component formation, high lap shear strength is required.

One of the specific goals for a resin in accordance with this invention is to obtain, over a broad operating temperature range, a composite loss factor or tan delta (tan D) of at least about 0.05 and preferably of at least about 0.1. Loss factor is a measure of conversion of external vibrational energy into heat energy by internal friction in the resin layer. The higher the loss factor, the greater the amount of vibrational energy that is converted to heat. This value may be measured on an Oberst-Beam by ASTM procedure E756-83. The goal of obtaining a high loss factor over a broad temperature range is desirably tied in to the ability of the resin to be used on a coil-line which has radical processing conditions involving mechanical stresses during the fabrication process and time/temperature parameters which can engender reaction kinetics completely unknown to anyone. A minimum shear strength of about 1000 psi at room temperature (e.g., 25° C.) is sought. Additionally, decrease in lap shear must be minimal at elevated temperatures; the lap shear should be about 750 psi at 250° F. A minimum peel strength of at least about 8, and preferably at least about 12 lbs/inch is sought for room temperature values. Furthermore, there should be no loss in damping or mechanical properties after a one-hour bake at 400° F. when tested at room temperature.

Resins used in vibration-damping applications frequently contain nitrogen atoms in their structure, and this is undesirable when end-items containing such polymers are exposed to pyrolytic temperatures associated with welding operations. Under such conditions, the nitrogen will form toxic, gaseous decomposition products, such as hydrogen cyanide, which are particularly hazardous in the immediate work environment. Other elements, such as chlorine, and sulfur and phosphorus also produce hazardous gases during the decomposition that occurs at the weld site. It is an object of the present invention to provide vibration-damping resins which contain only the elements hydrogen, oxygen and carbon, and which, nevertheless, have all the above-mentioned desirable attributes for a vibration-damping resin.

SUMMARY OF THE INVENTION

In accordance with the present invention, a resin, useful for vibration damping, is a generally linear, high molecular weight, chain of polyester or polyether blocks and epoxy blocks, all of which contain only the elements hydrogen, oxygen and carbon. The resin displays a glass transition region over a wider temperature range than is usually found in polymers. Composites comprise a layer of the viscoelastic resin adhering two sheets of metal, where the subject resin was designed to conform to the processing parameters of coil-line technology in addition to other laminating procedures.

DETAILED DESCRIPTION OF CERTAIN PREFERRED EMBODIMENTS

The polyester blocks of the resin are preferably formed by reacting a diol or mixture of diols with a multifunctional carboxylic acid or mixture of multifunctional carboxylic acids. The diol is provided in excess in order to produce a hydroxyl-terminated intermediate polyester polymer having a hydroxyl number of between about 20 and about 110, preferably between about 50 and about 90. The intermediate polyester polymer is then end-capped by reaction with an anhydride of a dicarboxylic acid, resulting in a half-ester of the anhydride and a carboxyl-terminated polymer having an acid number of between about 20 and about 110, preferably between about 50 and about 90. While this represents the currently preferred method of producing a carboxyl-terminated polyester, those skilled in the art will appreciate that a carboxyl-terminated polyester may be produced in other manners, such as reacting an excess of dicarboxylic acid with diol. Also, polyesters formed from alternative starting materials are suitable, providing they are carboxyl-terminated or can be carboxyl-terminated to provide the requisite acid numbers and carboxyl functionality.

The resins of the present invention are particularly suitable for coil-line application because: 1) They develop sufficient mechanical and vibration damping properties, even in the "green," i.e. not fully cured state and 2) They can, be synthesized via a route which includes a chain extension reaction to achieve sufficiently high molecular weight so as to already possess good mechanical properties prior to processing on the coil-line. By either method, the resin used to fabricate the composite on the coil-line ultimately imparts its desireable vibration damping capabilities to the fabricated composite. In simpler terms, the reaction mixture prepared for use on the coil-line uses polymers whose synthesis was tailored and designed for rapid cure, at least rapid substantial, if incomplete cure so as to overcome the rigorous conditions inherent in the coil-line process.

Suitable diols for forming the polyester include, for example, neopentyl glycol, ethylene glycol, diethylene glycol, cyclohexane dimethanol, butane diol, 1,6-hexane diol, propylene glycol and ethylene oxide and propylene oxide adducts of bisphenol A. Aromatic diols, e.g., resorcinols and bisphenols, may be used as well, particularly where vibration damping at a high temperature range is desired. Generally a mixture of diols is used. It is preferred that at least a portion of the diol content be a diol that provides the polyester with pendant alkyl groups, e.g., neopentyl glycol or propylene glycol.

Suitable dicarboxylic acids for forming the polyester include, for example, adipic acid, phthalic acid, terephthalic acid, isophthalic acid, 1,5-naphthalene dicarboxylic acid, 2,6-naphthalene dicarboxylic acid, 4,4'-biphenyl dicarboxylic acid, 5-sodium sulfoisophthalic acid, 1,4-cyclohexane dicarboxylic acid, 1,3-cyclohexane dicarboxylic acid, succinic acid, azelaic acid, sebacic acid, decane dicarboxylic acid, dodecane dicarboxylic acid, dimer fatty acids, and anhydrides of dicarboxylic acids. Dialkyl esters of these dicarboxylic acids may also be used. Generally, a mixture of dicarboxylic acids is used, particularly a mixture of aromatic dicarboxylic acids and aliphatic dicarboxylic acids. The mix of dicarboxylic acids used is selected to adjust the temperature range over which the polymers will display viscoelastic behavior. On a relative basis, aliphatic dicarboxylic acids tend to lower the $T_g$ (glass transition temperature), enhance peel strength and detract from lap shear; aromatic dicarboxylic acids tend to raise the $T_g$, contribute to damping properties at higher temperatures, enhance lap shear, and detract from peel performance. Thus, selection of an appropriate mix of dicarboxylic acids is used to provide an appropriate balance of properties. Dicarboxylic acid anhydrides are suitable for end-capping the hydroxyl-terminated polyester.

As an alternative to polyester blocks, polyether blocks, such as polyethylene glycol, polypropylene glycol, polyglycol copolymers, polytetrohydrofuran and the like, having only C, O and H, may also be used. The polyether chains preferably have molecular weights (weight average) of between about 400 and about 3000. Like the polyesters, the hydroxyl-terminated polyethers are end-capped with dicarboxylic acid anhydrides. Resins having polyether blocks, rather than polyester blocks, may be preferred for lower temperature vibration damping applications. To produce the subject resins, the carboxyl-terminated polyester or polyether is reacted with substantially an equivalent of epoxy, i.e., at an equivalence between about 0.95 and about 1.05. This results in a high molecular weight polymer containing epoxy blocks and polyester blocks. The polyester or polyether blocks are relatively soft blocks and the epoxy blocks are relatively hard blocks, enabling the final polymer to behave viscoelastically at a desired temperature range. The high molecular weight of the final resin product contributes to desirable mechanical properties.

To provide that the resin is soluble and flowable, the resin is substantially linear. This is provided for by reaction of generally linear, difunctional polyester or polyether resins with generally difunctional epoxy blocks. However, some branching may be permissible. Branching in the polyester blocks may be introduced by use of trifunctional alcohols, such as trimethylol propane or trifunctional acids or anhydrides, such as trimellitic anhydride. The carboxyl-terminated polyester or polyether has a carboxyl functionality between 2 and about 2.5 preferably between 2.0 and about 2.1.

Epoxy resins are used herein which contain only the elements H, C and O. It is preferred to use epoxies having epoxy equivalent weights of between about 100 and about 4000, most preferably between about 190 and about 850. Suitable epoxy resins include bisphenol A-derived resins, glycidyl esters, cycloaliphatic and aliphatic diepoxides made by peroxidation of diolefinic structures. Suitable diglycidyl ethers of bisphenol A and their higher molecular weight homologues for use in the present invention are sold by Shell under the tradename EPON, specifically EPON resin 828, epoxide equivalent weight (epw) 185-192; 1001F, epw 525-550; 1002F, epw 600-700; 1004F, epw 800-950; 1007F, epw 1700-2300; and 1009F, epw 2300-3800. Epoxies in accordance with the invention are generally linear, having terminal epoxy groups and have epoxy functionalities of between 2 and 3. An epoxy functionality of 2.0 to 2.1 is preferred. Vibration damping by the resins over a broad temperature range is believed to be a result of the inclusion of both epoxy blocks and polyester or polyether blocks. Aliphatic polyesters and polyethers tend to provide vibration damping over a narrow temperature range at relatively low temperatures; epoxy resins containing ring structures tend to provide vibration damping at relatively high temperatures; thus the combination of polyester or polyether blocks and epoxy blocks in the same polymer chain can provide vibration damping over a wider temperature range when other requirements have been met. Viscoelastic resins in accordance with the invention can provide a composite loss factor of at least 0.05 and preferably 0.1 or greater over temperature ranges of at least 100° F. (55.5° C.). To provide vibration damping, the resin must be in its glass transition region where it will become viscoelastic. To provide the broadest ranges or usable vibration damping, it is desirable that the glass transition range of the resin be selected to coincide with operating temperature of the component in which the resin is to be utilized. The glass transition temperature range of the subject resin may be adjusted by the selection of epoxy resins and/or polyester blocks. Generally aliphaticity provides resins with lower $T_g$s while aromaticity and cyclic structures provide higher $T_g$s.

When the reaction between the epoxy groups and carboxyl groups is complete, very long polymer chains are formed, giving the resins their characteristic mechanical properties and damping performance.

In forming a composite in accordance with the present invention, reaction between epoxy blocks and carboxyl groups of the polyester or polyether takes place at the point of application. The epoxy block and carboxyl-terminated polymer are mixed together just prior to application. The heat that is applied immediately after application, as described with respect to a coil line above, both flashes away organic solvent and promotes reaction between carboxyl groups and epoxy groups. As a result, immediate peel strength between the metal layers is achieved, allowing the composite to survive unharmed during its movement over coil-line roll arrangements and final wind-up.

To ensure reaction between the epoxy groups and the carboxyl groups, it is generally preferred to provide a cure catalyst. Suitable cure catalysts include tertiary amines and their salts, quarternary amines, alkali metal alcoholates and phenolates, alkali metal hydroxides and their salts. Preferred cure catalysts include those which contain chromium, e.g. AMC-2 (a proprietary chromium catalyst from Aerojet); triphenyl phosphine; alkyl and aryl phosphonium halides and acetates; and DMP-30 [tris (2,4,6-dimethylaminomethyl) phenol]. Cure catalysts are typically used at between about 0.1 and about 8 phr, preferably between about 1 and about 4 phr.

It has been found to be advantageous, in some cases, to prereact some of the epoxy with an excess of carboxyl-terminated polyester or polyether blocks thereby forming a chain-extended carboxyl-terminated polyester or polyether. The preferred range is from about 3:2 to 6:5 of polyester to epoxy. From a 2:1 up to about a 10:9 equivalent ratio of polyester or polyether to epoxy may be so prereacted. The preferred range is from about 3:2 to about 6:5. This chain extension reaction provides longer polymer chains which react at the point of application with the remaining epoxy, i.e., that amount of epoxy needed to provide a stoichiometric ratio of carboxyl and epoxy groups of about 0.95 to about 1.05, as described above. Chain extension is desirable to rapidly achieve mechanical and vibration-damping properties, as is particularly desired in a coil line.

The reaction mixture, i.e., that prepared by adding the carboxyl-terminated polyester or polyether or chain-extended polyester or polyether to the epoxy just prior to application to the metal, generally is thinned with organic solvent, such as methylethylketone, methylisobutylketone, N-methyl pyrrolidone, dimethyl formamide, ethyl acetate, toluene, dibasic acid esters, tetrahydrofuran, glycol ethers and the like. The solids level may vary over a large ratio, depending upon the amount of solvent needed to adjust the viscosity. Generally, the reaction mixture contains between about 15 and about 80% solids, typically between about 40 and about 60% solids. It is preferred to use as little solvent as possible, as the solvent must be removed.

The reaction mixture of epoxy and carboxyl-terminated polyester or chain-extended polyester will occur slowly, even at room temperature, but more rapidly as the temperature is increased. In a coil line or similar processes where rapid evaporation and rapid cure of the solvent is required, temperatures sufficiently high to accomplish these aims must be used with due consideration given to line speed and web thickness and width.

Sufficient mixture of epoxy and polyester or polyether, or chain-extended polyester or polyether is added to the metal substrate to provide a vibration damping resin layer between about 0.5 to about 3 mil thick (12.5–75 microns), with 1 mil (25 microns) being typical. For economy sake, it is generally desirable to provide a thin layer of the vibration damping layer. The thickness of the layer may depend upon the degree to which the layer will be "drawn out" during shaping of the composite into a component part. Although in the procedure described generally above, the reaction mixture is applied to one sheet of metal in a coil-coating procedure, there may be advantages to applying reaction mixture to the facing sides of both sheets of metal.

The metal most often used in composites of this type is steel. However, the viscoelastic resins of the present invention are useful in bonding sheets of any metal or combination of metals, such as aluminum or galvanized steel. The metal is preferably cleaned, but uncoated, on the bonding surfaces; however, coated metal surfaces may be bonded as well.

The invention will now be described in greater detail by way of specific examples.

EXAMPLE 1

A polyester (PE(a)) suitable for use in the invention was formulated and prepared as follows: Pilot plant batch of 35 kg polyester charge:

|  | Molar Ratio | Mols | Eq COOH | Eq OH | Mol Fract | Wt. | Mol Wt. | % Wt. |
|---|---|---|---|---|---|---|---|---|
| Acid |  |  |  |  |  |  |  |  |
| 1. AdA | 4.2550 | 48.847 | 97.694 |  | 0.1882 | 7138.50 | 20.40 | 146.14 |
| 2. IPA | 3.1910 | 36.632 | 73.265 |  | 0.1411 | 6085.73 | 17.39 | 166.13 |
| 3. TPA | 3.1910 | 36.632 | 73.265 |  | 0.1411 | 6085.73 | 17.39 | 166.13 |
| Glycol |  |  |  | g TPT | ---->> | 2.53 | 0.01 |  |
| 1. HD | 8.5060 | 97.648 |  | 195.296 | 0.3762 | 11540.04 | 32.97 | 118.18 |
| 2. NPG | 3.4690 | 39.824 |  | 79.648 | 0.1534 | 4147.65 | 11.85 | 104.15 |
|  | TOTAL | 259.583 | 244.223 | 274.944 | 1.0000 | 35000.18 | 100.00 | 134.82 |
|  |  |  |  | Theo H$_2$O @ R | 4381.54 | 12.52 |  |  |
|  |  |  |  | Yield @ R | 30618.64 | 87.48 |  |  |

AdA = adipic acid, IPA = isophthalic acid, TPA = terephthalic acid, HD = hexane diol, NPG = neopentyl glycol

SCALING FACTORS

| Glycols | 1.0000 |  |  |
|---|---|---|---|
| Acids | 1.0000 |  |  |
| Batch size | 11.4799 |  |  |
| OH/COOH | 1.126 | Theo OH # at R | 58.264 |
| Initial Acid # | 391.52 | Deg. of Polym. | 15.795 |
| Ext Of React (set) | 0.9956 | No. Ave Mol Wt | 1862.9 |
| Final Acid # | 1.97 |  |  |

Polyester (PE(a)) Synthesis

1) Charge 1,6-HD, NPG and carboxylic acids. Heat to 150° C.

-continued

2) Heat to 240° C. and hold until acid number is less than 20.
3) Apply vacuum through the steam jacketed column (steam trickled on). Pull vacuum to 150 mm Hg at 240° C. and hold until acid number < 2.0.
4) Cool to about 120° C. and transfer to 30 gal glass lined reactor.
   * Record weight of material transferred *
4) Add the calculated amount of phthalic anhydride (PAN) to obtain weight of PE(a) and hold at 110° C. for 30 minutes.

$$\text{Wt PAN} = \frac{(\text{lbs. PE(a)})(453.6 \text{ g/lb})(\text{OH\# PE(a)})(148.11)}{56,109}$$

5) Maintain at 110° C. for phthalic anhydride addition. After PAN is reacted, dilute to 80% solids with methyl isobutyl ketone (MIBK). Stir for 30 minutes.
   Wt MIBK = (Wt PE(a)/0.8 − Wt PE(a))

EXAMPLE 2
(Protocol for 5:4 Chain extension with EPON 1004 (epoxy)

1) Measure acid number of capped polyester (PE(a)) of Example 1 at 80% solids
2) Charge the following amount of 50% Epon 1004 solution in MIBK:

$$\text{Wt 50\% 1004} = \frac{(\text{Wt Capped PE(a) Soln})(\text{Acid \#})(0.8)(\text{Wt/Epoxide 1004 Soln})}{56109}$$

3) Add 0.5% (Based on wt. solids) AMC-2 catalyst
4) Dilute to 60% solids with MIBK and heat to 95° C., hold until the acid number reaches 3.7
5) Dilute to 40% solids with MIBK.

EXAMPLE 3
(Protocol for 3:2 Chain extension with EPON 1004 epoxy))

1) Measure acid number of capped polyester (PE(a)) of example 1 at 80% solids.
2) Charge the following amount of 50% Epon 1004 solution in MIBK:

$$\text{Wt 50\% 1004} = \frac{(\text{Wt Capped PE(a) Soln})(\text{Acid \#})(.66)(\text{Wt/Epoxide 1004 Soln})}{56109}$$

3) Add 0.5% (based on wt. solids) AMC-2 catalyst
4) Dilute to 66% solids with MIBK and heat to 95° C., hold until the acid number reaches 6.7
5) Dilute to 50% solids with MIBK.

EXAMPLE 4

Polyester (PE(b)) is prepared in a manner similar to PE(a) of Example 1. The glycol composition of PE(b) is 70% HD, 30% NPG; the acid content is 40% AdA, 30% IPA, 30% TPA; molecular weight prior to end-capping with PAN about 3000; and solids 78.5% in methylethylketone (MEK).

EXAMPLE 5

Polyether (PE(c)) is prepared by end-capping polypropyleneglycol (PPG) (425 MW) with two moles of phthalic anhydride.

EXAMPLE 6

Sample preparation and testing is done in the following manner:

A) Sample Preparation

The appropriate ratio of carboxy terminated polyester or polyether/epoxy block polymer and epoxy curative are applied at approximately 40% solids in methyl isobutyl ketone (or other appropriate solvent) to both sides of cleaned steel plates by use of a wire wound application rod to give 1–3 mils of wet coating on each plate. The steel plates are dried in an oven at 121° C. for 5 minutes to remove the solvent. The plates are then placed with the coated surfaces to the inside and then press-bonded at 200° C. for 10 minutes under pressure of 10 lbs/sq. inch.

B) Sample Testing

Samples were tested for peel strength, lap shear strength, damping efficiency, and heat stability.

i) Peel Strength—(ASTM No. D 1876-72)

One half inch wide strips of the laminate from A) above are checked for 180° peel strength in an Instron at a rate of 5 inches/minute at a temperature of 25° C. A minimum peel strength of 10 lbs/inch is desired.

ii) Lap Shear Strength—(ASTM No. SD 1002-72)

A one inch square laminated sample was prepared in the manner as in A) above and the lap shear was tested at 25° C. with an Instron at an elongation rate of 0.002 inches/min. A minimum lap shear strength of 1000 lbs/square inch is desired.

iii) Damping Properties

Damping efficiency (composite loss factor or tan delta) is measured on a laminated sample by a Rheometrics RSA-2 Dynamic Mechanical Analyzer by applying a forced vibration by a mechanical impedance method using a three point bending mode at the center wherein the frequency was 10 Hz and the loss factor was measured least 0.1 is desired over as broad a temperature range as possible. This temperature range must of course, coincide with the actual use temperature (i.e., under the hood automotive applications will require a higher temperature range than automotive body side panels which operate at approximately ambient temperatures).

iv) Heat Stability

The properties listed in 1) through iii) are rerun after heat testing the laminate that is wrapped in foil and heated for one hour at 400° F. (204° C.). There should be minimal changes in properties of the heat-aged laminate from the original laminate before heat aging. In addition there should be no melt flow of the polymer core outside of the laminate when subjected to the heat aging test.

Examples of polymers utilizing compositions listed in the invention and their properties are listed in the following table.

In the tabulated formulations below, the initiator in each case is AMC-2. The Column labelled TEMP/-TAN D max is the temperature at which the maximum tan D is observed and the tan D at that temperature. The Columns marked LOW TEMP, HIGH TEMP and RANGE refer to the minimum and maximum temperatures where a tan D of 0.1 is achieved and the temperature range over which a tan D of 0.1 is achieved. Peel is in lbs./in.; lap shear is in lbs./in$^2$. Dry and press conditions are °C., min. In no case was oozing observed at samples held at 204° C. for 1 hr.

2. A vibration-damping composite comprising a pair of metal sheets adhered together by a viscoelastic vibration-damping resin consisting essentially of the reaction product between bisphenol-derived epoxy resins having terminal epoxy functionalities, epoxy equivalent weights of between about 100 and about 2000 and epoxy functionalities of between 2 and about 3 and containing only carbon, hydrogen and oxygen atoms and generally linear carboxyl-terminated blocks of either 1) polyester blocks having acid numbers between about 20 and about 110 and carboxyl functionality of between 2 and about 2.5; or 2) polyether blocks of weight average molecular weight of between about 400 and 3000 and carboxyl functionality of between 2 and about 2.5, said polyester or polyether blocks containing only carbon, hydrogen and oxygen atoms, the ratio of equivalents of epoxy functionality and carboxyl functionality being

TABLE I

| PE | EXTENDER EPOXY | PE/ EPOXY EXTEND. | CURING EPOXY | DRYING COND. | PRESS COND. | TEMP/ TAN D MAX | LOW TEMP | HIGH TEMP | RANGE | PEEL | LAP SHEAR |
|---|---|---|---|---|---|---|---|---|---|---|---|
| a | 1002 | 5:4 | 828  | 121,5 | 204,10 | 52.4/0.334 | 42 | 90  | 48 | 11 | 1797.0 |
| a | 1002 | 5:4 | 1002 | 121,5 | 204,10 | 55.1/0.380 | 44 | 72  | 28 | 10 | 1812.0 |
| a | 1002 | 5:4 | 1002 | 110,4 | 232,5  | 59.9/0.313 | 51 | 118 | 67 | 26 | 1128.0 |
| a | 1002 | 5:4 | 1004 | 121,5 | 204,10 | 56.6/0.344 | 48 | 80  | 32 | 14 | 1718.0 |
| b | 1004 | 3:2 | 828  | 177,5 | 232,10 | 42.2/0.246 | 34 | 108 | 74 | 17 | 1466.0 |
| b | 1004 | 3:2 | 1004 | 177,5 | 232,10 | 44.9/0.321 | 38 | 109 | 71 | 15 | 1715.0 |
| b | 1004 | 5:4 | 828  | 121,5 | 204,5  | 41.6/0.327 | 33 | 93  | 60 | 24 | 1741.0 |
| b | 1004 | 5:4 | 1002 | 121,5 | 504,5  | 45.7/0.308 | 32 | 108 | 76 | 16 | 1762.0 |
| c | 828  | 5:4 | 1002 | 121,5 | 177.10 | 40.1/0.395 | 30 | 68  | 38 | 18 | 1338.0 |

While the invention has been described in terms of certain preferred embodiments, modifications obvious to one with ordinary skill in the art may be made without departing from the present invention.

Various features of the invention are set forth in the following claims.

What is claimed is:

1. A viscoelastic, vibration-damping resin consisting essentially of the reaction product between bisphenol-derived epoxy resins having terminal epoxy functionalities, epoxy equivalent weights of between about 100 and about 2000 and epoxy functionalities of between 2 and about 3 and containing only carbon, hydrogen and oxygen atoms and carboxyl-terminated blocks of either 1) polyester blocks having acid numbers between about 20 and about 110 and carboxyl functionalities of between 2 and about 2.5; or 2) polyether blocks of weight average molecular weight of between about 400 and 3000 and carboxyl functionalities of between 2 and about 2.5, said polyester or polyether blocks containing only carbon, hydrogen and oxygen atoms, the ratio of equivalents of epoxy functionality and carboxyl functionality being between about 0.95 and about 1.05 and being adjusted so that said vibration-damping resin, if used to adhere two sheets of metal, provides a composite loss factor of at least about 0.05 over a temperature range of at least about 100° F. (55.5° C.).

between about 0.95 and about 1.05 and being adjusted so that said vibration-damping resin, if used to adhere two sheets of metal, provides a loss factor of at least about 0.05 over a temperature range of at least about 100° F. (5.5° C.).

3. A vibration-damping resin in accordance with claim 1 wherein said bisphenol-derived resin is a bisphenol glycidyl ether.

4. A vibration-damping resin in accordance with claim 1 wherein said blocks are polyester blocks formed from monomers consisting of a diol or mixture of diol and a multifunctional carboxylic acid or mixture of carboxylic acids.

5. A vibration-damping resin in accordance with claim 4 wherein said polyester blocks are formed from a random polymerization of a mixture of diols and a mixture of multifunctional carboxylic acids.

6. A composite in accordance with claim 2 wherein said bisphenol-derived resin is a bisphenol glycidyl ether.

7. A composite in accordance with claim 2 wherein said blocks are polyester blocks formed from monomers consisting of a diol or mixture of diol and a multifunctional carboxylic acid or mixture of carboxylic acids.

8. A composite in accordance with claim 7 wherein said polyester blocks are formed from a random polymerization of a mixture of diols and a mixture of multifunctional carboxylic acids.

* * * * *

UNITED STATES PATENT AND TRADEMARK OFFICE
CERTIFICATE OF CORRECTION

PATENT NO. : 5,356,715

DATED : October 18, 1994

INVENTOR(S) : Levine, et al

It is certified that error appears in the above-indentified patent and that said Letters Patent is hereby corrected as shown below:

```
At Column 9, Line 29, "504,5" should be --204,5--.
At Column 10, Line 35, "(5.5° C.)" should be --(55.5° C.)--.
At Column 10, Line 38, "glycidyl" should be --diglycidyl--.
At Column 10, Line 49, "glycidyl" should be --diglycidyl--.
```

Signed and Sealed this

Twenty-eight Day of March, 1995

Attest:

BRUCE LEHMAN

*Attesting Officer*         *Commissioner of Patents and Trademarks*